US012574136B2

(12) United States Patent
Shimizu et al.

(10) Patent No.: US 12,574,136 B2
(45) Date of Patent: Mar. 10, 2026

(54) OPTICAL AMPLIFICATION SYSTEM, OPTICAL AMPLIFICATION APPARATUS AND OPTICAL AMPLIFICATION METHOD

(71) Applicant: NTT, Inc., Tokyo (JP)

(72) Inventors: Shimpei Shimizu, Musashino (JP); Takushi Kazama, Musashino (JP); Takayuki Kobayashi, Musashino (JP); Yutaka Miyamoto, Musashino (JP); Takeshi Umeki, Musashino (JP)

(73) Assignee: NTT, Inc., Tokyo (JP)

( * ) Notice: Subject to any disclaimer, the term of this patent is extended or adjusted under 35 U.S.C. 154(b) by 295 days.

(21) Appl. No.: 18/289,380

(22) PCT Filed: May 21, 2021

(86) PCT No.: PCT/JP2021/019408
§ 371 (c)(1),
(2) Date: Nov. 3, 2023

(87) PCT Pub. No.: WO2022/244255
PCT Pub. Date: Nov. 24, 2022

(65) Prior Publication Data
US 2024/0250768 A1 Jul. 25, 2024

(51) Int. Cl.
*H04B 10/291* (2013.01)
*G02F 1/39* (2006.01)
(Continued)

(52) U.S. Cl.
CPC .......... *H04J 14/0209* (2013.01); *G02F 1/392* (2021.01); *H04B 10/291* (2013.01);
(Continued)

(58) Field of Classification Search
CPC . H04B 10/291; H04B 10/294; H04J 14/0221; H04J 14/0209; H04J 14/02216; G02F 1/392
(Continued)

(56) References Cited

U.S. PATENT DOCUMENTS 6,867,903 B2 * 3/2005 Imajuku .................. G02F 1/395
                                                      359/332
2013/0314769 A1 * 11/2013 Inafune ................ H04B 10/291
                                                      359/341.3
2022/0004081 A1 1/2022 Embutsu et al.

FOREIGN PATENT DOCUMENTS

JP        2020-086031 A     6/2020

OTHER PUBLICATIONS

Umeki et al., "Simultaneous nonlinearity mitigation in 92×180-Gbit/s PDM-16QAM transmission over 3840 km using PPLN-based guard-band-less optical phase conjugation", Optics Express, vol. 24, No. 15, pp. 16945-16951, Jul. 2016 (Year: 2016).*
(Continued)

*Primary Examiner* — Li Liu

(57) ABSTRACT

The present invention provides an optical amplification system (1) having a plurality of cascade-connected optical amplification units (11), wherein the optical amplification units (11) comprise: a band division unit (111) that divides an optical signal into optical signals of two different bands; a polarized wave division unit (112) that divides the divided optical signals into two polarized wave components orthogonal to each other, an excitation light multiplexing unit (113) that multiplexes excitation light and the optical signals divided by the polarized wave division unit (112); an amplification medium (115) that generates an optical parametric amplification and amplifies the optical signals; an excitation light division unit (117) that divides the excitation light and the optical signals amplified by the amplification
(Continued)

medium (115); a polarized wave synthesis unit (118) that synthesizes the two divided polarized wave components; and a band multiplexing unit (119) that multiplexes the two divided bands.

6 Claims, 7 Drawing Sheets

(51) Int. Cl.
    *H04B 10/294*          (2013.01)
    *H04J 14/02*           (2006.01)
(52) U.S. Cl.
    CPC ........ *H04B 10/294* (2013.01); *H04J 14/0221*
                (2013.01); *H04J 14/02216* (2023.08)
(58) Field of Classification Search
    USPC ............................. 398/37, 79, 160, 173, 180
    See application file for complete search history.

(56)                  References Cited

OTHER PUBLICATIONS

Kobayashi et al., "Wide-band Inline-Amplified WDM Transmission Using PPLN-Based Optical Parametric Amplifier", Journal of Light-wave Technology, vol. 39, No. 3, IEEE, pp. 787-794, Feb. 2021 (Year: 2021).*

Peiris S et al: "Engineering an Extended Gain Bandwidth Hybrid Raman-Optical Parametric Amplifier for Next Generation CWDM PON", Journal of Lightwave Technology, IEEE, USA, vol. 32, No. 5, Mar. 1, 2014 (Mar. 1, 2014), pp. 939-946 (Year: 2014).*

T. Kobayashi et al., "Wide-band Inline-Amplified WDM Transmission Using PPLN-Based Optical Parametric Amplifier", Journal of Lightwave Technology, vol. 39, No. 3, IEEE, pp. 787-794, Feb. 2021.

T. Umeki et al., "Simultaneous nonlinearity mitigation in 92×180-Gbit/s PDM-16QAM transmission over 3840 km using PPLN-based guard-band-less optical phase conjugation", Optics Express, vol. 24, No. 15, pp. 16945-16951, Jul. 2016.

Peiris S et al: "Engineering an Extended Gain Bandwidth Hybrid Raman-Optical Parametric Amplifier for Next Generation CWDM PON", Journal of Lightwave Technology, IEEE, USA, vol. 32, No. 5, Mar. 1, 2014 (Mar. 1, 2014), pp. 939-946, XP011537174, ISSN: 0733- 8724, DOI: 10. 1109/JLT. 2013. 2295176 [retrieved on Jan. 13, 2014].

Kobayashi T et al: "Wideband Inline-Amplified WDM Transmission using PPLN-Based OPA with Over-10-THz Bandwidth", 2020 Optical Fiber Communications Conference and Exhibition (OFC), OSA, Mar. 8, 2020 (Mar. 8, 2020), pp. 1-3, XP033767320, DOI: 10. 1364 /OFC. 2020. TH4C. 7 [retrieved on Apr. 30, 2020].

* cited by examiner

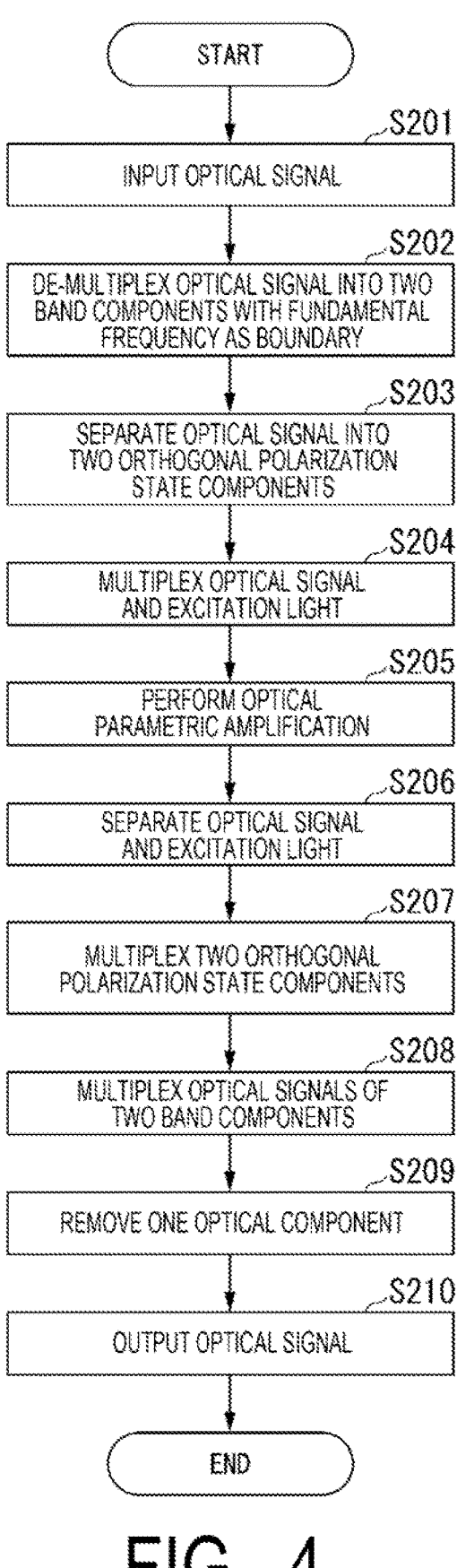

START

S201
INPUT OPTICAL SIGNAL

S202
DE-MULTIPLEX OPTICAL SIGNAL INTO TWO
BAND COMPONENTS WITH FUNDAMENTAL
FREQUENCY AS BOUNDARY

S203
SEPARATE OPTICAL SIGNAL INTO
TWO ORTHOGONAL POLARIZATION
STATE COMPONENTS

S204
MULTIPLEX OPTICAL SIGNAL
AND EXCITATION LIGHT

S205
PERFORM OPTICAL
PARAMETRIC AMPLIFICATION

S206
SEPARATE OPTICAL SIGNAL
AND EXCITATION LIGHT

S207
MULTIPLEX TWO ORTHOGONAL
POLARIZATION STATE COMPONENTS

S208
MULTIPLEX OPTICAL SIGNALS OF
TWO BAND COMPONENTS

S209
REMOVE ONE OPTICAL COMPONENT

S210
OUTPUT OPTICAL SIGNAL

END

FIG. 4

OPTICAL AMPLIFICATION SYSTEM, OPTICAL AMPLIFICATION APPARATUS AND OPTICAL AMPLIFICATION METHOD

CROSS-REFERENCE TO RELATED APPLICATIONS

This application is a 371 U.S. National Phase of International Application No. PCT/JP2021/019408, filed on May 21, 2021. The entire disclosure of the above application is incorporated herein by reference.

TECHNICAL FIELD

The present invention relates to an optical amplification system, an optical amplification apparatus, and an optical amplification method.

BACKGROUND ART

In long-distance optical fiber transmission, an optical amplification relay transmission system is used in which an optical signal is amplified by optical amplifiers provided at regular intervals. The optical amplifier compensates for an optical loss caused when the optical signal propagates through the optical fiber. Therefore, the transmission band of the optical fiber transmission system is limited by the amplification band of the optical amplifier. As one of general optical amplifiers, there is a rare-earth-doped optical amplifier in which a rare-earth element is added to an optical fiber. The amplification band of an erbium-doped fiber amplifier (EDFA), which is a typical rare earth-doped optical amplifier, is about 4 [THz] in the C-band (about 1530 to 1565 [nm]), which is a wavelength band generally used in long-distance optical fiber transmission.

As a method of avoiding the limitation of the transmission band caused by the amplification band of the optical amplifier as described above and realizing wide-band optical amplification, a method of extending the transmission band by arranging different amplifiers in parallel is considered. The different amplifier referred to herein is, for example, an optical amplifier in which an amplification band is shifted by making a rare earth element added to an optical fiber different. However, this method has a problem that the gain is low and the noise figure is high in a band other than the C-band. In addition, in order to suppress an increase in device cost, operation cost, and the like of the optical fiber transmission system, it is desirable to use a single type of optical amplifier.

In addition, there is a semiconductor optical amplifier (SOA) as an optical amplifier that realizes broadband optical amplification. It has been demonstrated that the SOA can realize an amplification band of 12 [THz] or more. However, it has been reported that signal distortion occurs in the SOA due to an increase or decrease in input power of a signal. In the case of considering application to an optical network in consideration of add-drop of a wavelength channel or the like, it is not desirable that the optical amplifier have such a characteristic that signal distortion occurs due to an increase or decrease in input power of a signal.

Therefore, in recent years, an optical parametric amplifier (OPA) has attracted attention. The OPA is an optical amplifier that amplifies input light by allowing light beams having different wavelengths to interact with each other using a nonlinear optical effect in a nonlinear optical medium such as lithium niobate as a second-order nonlinear optical medium or an optical fiber as a third-order nonlinear optical medium. In order to realize both broadband characteristics and high gain, particularly, a configuration using periodically poled lithium niobate (PPLN) as an amplification medium is promising. It has been demonstrated that OPA using PPLN as an amplification medium can realize broadband relay amplification transmission exceeding 10 [THz] with an amplification gain of 15 [dB] (see Non Patent Literature 1). In addition, the optical parametric amplification process has a very high reaction rate. Therefore, the OPA can realize a highly robust optical amplification characteristic even with respect to an increase or decrease in input power of a signal.

In the second-order nonlinear optical medium including the PPLN, the nonlinear optical effect is exhibited only for the polarization state in a specific direction. Therefore, a polarization diversity configuration is required in which an optical signal is subjected to polarization separation by a polarization beam splitter or the like before being amplified, and is multiplexed after being amplified. In addition, even in the third-order nonlinear optical medium, a gain according to the polarization state of the excitation light is generated. Therefore, in order to suppress a polarization differential gain (PDG), it is desirable to use the polarization diversity configuration as described above.

In the OPA, idler light that is phase conjugate light of an optical signal is generated as a secondary effect generated at the time of amplification of an input optical signal. For signal transmission, any one light component of an original optical signal and idler light may be transmitted. The light component not used for signal transmission is cut by the wavelength filter.

When idler light is used for signal transmission, the OPA functions as an optical phase conjugator (OPC) and can compensate for optical noise in a phase direction such as nonlinear phase distortion (see Non Patent Literature 2). In addition, even in a case where the compensation effect such as the nonlinear phase distortion is not used, the OPA can be used as a wavelength converter (see Patent Literature 1). Using the phase conjugate light as a new transmission optical signal, it is possible to offset the noise in the phase direction such as the nonlinear phase distortion generated in the transmission so far with the noise generated in the transmission after the phase conjugate conversion.

CITATION LIST

Patent Literature

Patent Literature 1: JP 2020-086031 A

Non Patent Literature

Non Patent Literature 1: T. Kobayashi et al., "Wide-band Inline-Amplified WDM Transmission Using PPLN-Based Optical Parametric Amplifier", Journal of Lightwave Technology, Vol. 39, No. 3, IEEE, pp. 787-794, February 2021.

Non Patent Literature 2: T. Umeki et al., "Simultaneous nonlinearity mitigation in 92×180-Gbit/s PDM-16QAM transmission over 3840 km using PPLN-based guard-band-less optical phase conjugation", Optics Express, Vol. 24, No. 15, pp. 16945-16951, July 2016.

SUMMARY OF INVENTION

Technical Problem

The idler light is generated at a frequency symmetrical to the optical signal with respect to a fundamental frequency that is a center frequency of the phase matching character-istic of the amplification medium. Therefore, at the time of amplification in the OPA, it is necessary to leave a band in which idler light is generated, and an optical signal cannot be arranged in the band. Therefore, in order to use the amplification band of the OPA maximally, it is necessary to have a configuration in which an optical signal is divided into two bands around a fundamental frequency, each optical signal is amplified by nonlinear media different from each other, and unnecessary light components are cut by a wave-length filter and then multiplexed. As described above, the unnecessary light component mentioned here is a light component that is not used for signal transmission among the original optical signal and the idler light.

In order to increase the gain of the OPA, for example, a method of increasing the optical power of the excitation light, a method of increasing the medium length, a method of increasing the non-linear constant of the medium, or the like can be considered. In the optical fiber-based OPA, a high-output 1.55 [μm] band EDPA can be used in order to increase the power of the excitation light. However, the high-power excitation light induces self-phase modulation, cross-phase modulation, and unnecessary four-wave mixing, which are third-order nonlinear effects. As a result, the high-power excitation light causes a decrease in parametric amplification efficiency for the optical signal and crosstalk between wavelength channels.

In the second-order non-linear medium, the influence of the third-order non-linear effect is relatively small, but the wavelength band of the excitation light is twice the fre-quency of the signal in the 1.55 [μm] band, and a high-output optical amplifier such as an EDFA cannot be directly used. Therefore, a configuration is used in which high-power excitation light in the 1.55 [μm] band is generated using the EDFA, and then the generated excitation light is converted into excitation light having a frequency of 2 times using second harmonic generation that is a second-order nonlinear effect. Therefore, the power of the excitation light is limited not only by the output of the EDFA but also by the efficiency of the second-order harmonic generation.

In a case where the medium length is increased, the phase matching relationship is deteriorated due to various types of dispersion in the optical fiber. Therefore, it is difficult to efficiently increase the gain. In the second-order non-linear medium, the medium length can be lengthened while main-taining the phase matching by the quasi-phase matching by the periodically poled structure. However, gain saturation due to pump depression limits gain. Increasing the non-linear constant of the medium can also increase the gain, but the gain is also limited by the gain saturation due to the pump depression.

On the other hand, in optical communication, a span loss between amplification repeaters in a long-distance backbone transmission network is about 20 to 30 [dB] including losses of components such as a filter and a gain equalizer. The optical amplifier is required to have a gain that compensates for the span loss. Furthermore, in consideration of non-relay transmission or the like with a large loss such as spatial optical communication, it is conceivable that a gain of 40 [dB] or more be required. Furthermore, when the total power of the entire optical signal increases due to wavelength multiplexing, not only the amplification gain but also the saturation output power due to the gain saturation charac-teristic becomes important. In the case of amplifying the optical signal in the gain saturation region, there is a problem that the amplification is not linearly performed with respect to the temporal power fluctuation, and the modulation pattern is greatly distorted. As described above, in the optical parametric amplification, gain saturation occurs due to pump depression of the excitation light, and thus satura-tion output power is limited. This state can be described as simultaneous differential equations of Equations (1) to (3) below in the case of a secondary nonlinear medium having an ideal phase matching characteristic with respect to the propagation direction (z direction) of light.

[Math. 1]

$$\frac{d|A_p|}{dz} = -2\kappa|A_s||A_i| \tag{1}$$

[Math. 2]

$$\frac{d|A_s|}{dz} = \kappa|A_p||A_i| \tag{2}$$

[Math. 3]

$$\frac{d|A_i|}{dz} = \kappa|A_p||A_s| \tag{3}$$

Here, $A_p$, $A_s$, and $A_i$ are amplitudes of the phase conjugate light (idler light) of the excitation light, the signal light, and the signal light grown along with the OPA, respectively. In addition, K is a constant representing the generation effi-ciency of the nonlinear process. From these equations, it can be seen that when the generation efficiency of the nonlinear process increases, the amplification gain increases, but the consumption of the excitation light is accelerated accord-ingly, and the saturated output power tends to decrease due to rapid pump depression.

As described above, the increase in the gain of the OPA and the increase in the output of the saturation output power are limited by various factors. Therefore, in order to apply the OPA in various regions, there are problems of high gain and high output.

In view of the above circumstances, an object of the present invention is to provide an optical amplification system, an optical amplification apparatus and an optical amplification method capable of performing parametric amplification with higher gain and higher output.

Solution to Problem

An aspect of the present invention is an optical amplifi-cation system including a plurality of optical amplification units cascade-connected, in which the optical amplification unit includes a band division unit that divides an optical signal into optical signals of two different bands, a polar-ization demultiplexing unit that separates the divided optical signal into two polarization components orthogonal to each other, an excitation light multiplexing unit that multiplexes the optical signal separated by the polarization demultiplex-ing unit and an excitation light, an amplification medium that generates an optical parametric amplification process and amplifies the optical signal, an excitation light separa-tion unit that separates the optical signal amplified by the amplification medium and the excitation light, a polarization combining unit that combines the two separated polarization components, and a band multiplexing unit that multiplexes the two divided bands.

An aspect of the present invention is an optical amplifi-cation device having a plurality of optical amplification media cascade-connected, the optical amplification device including a band division unit that divides an optical signal into optical signals of two different bands, a polarization demultiplexing unit that separates the divided optical signal into two polarization components orthogonal to each other, an excitation light multiplexing unit that multiplexes the optical signal separated by the polarization demultiplexing unit and an excitation light, a first amplification medium that generates an optical parametric amplification process and amplifies the optical signal, a second amplification medium that generates the optical parametric amplification process and amplifies the optical signal amplified by the first amplification medium, an excitation light separation unit that separates the optical signal amplified by the second amplification medium and the excitation light, a polarization combining unit that combines the two separated polarization components, and a band multiplexing unit that multiplexes the two divided bands.

An aspect of the present invention is an optical amplification method by an optical amplification system including a plurality of optical amplification units cascade-connected, the optical amplification method including a band division step of causing the optical amplification unit to divide an optical signal into optical signals of two different bands, a polarization demultiplexing step of causing the optical amplification unit to separate the divided optical signal into two polarization components orthogonal to each other, an excitation light multiplexing step of causing the optical amplification unit to multiplex the optical signal separated in the polarization demultiplexing step and an excitation light, an amplification step of causing the optical amplification unit to generate an optical parametric amplification process and amplify the optical signal, an excitation light separation step of causing the optical amplification unit to separate the optical signal amplified in the amplification step and the excitation light, a polarization combining step of causing the optical amplification unit to combine the two separated polarization components, and a band multiplexing unit that cause the optical amplification unit to multiplex the two divided bands.

An aspect of the present invention is an optical amplification method by an optical amplification device having a plurality of optical amplification media cascade-connected, the optical amplification method including a band division step of dividing an optical signal into optical signals of two different bands, a polarization demultiplexing step of separating the divided optical signal into two polarization components orthogonal to each other, an excitation light multiplexing step of multiplexing the optical signal separated in the polarization demultiplexing step and an excitation light, a first amplification step of generating, by a first amplification medium, an optical parametric amplification process and amplifying the optical signal, a second amplification step of generating, by a second amplification medium, an optical parametric amplification process and amplifying the optical signal amplified in the first amplification step, an excitation light separation step of separating the optical signal amplified in the second amplification step and the excitation light, a polarization combining step of combining the two separated polarization components, and a band multiplexing step of multiplexing the two divided bands.

Advantageous Effects of Invention

According to the present invention, parametric amplification with higher gain and higher output can be performed.

BRIEF DESCRIPTION OF DRAWINGS

FIG. 4 is a flowchart illustrating an operation of the optical amplification device 11 according to the first embodiment of the present invention.

DESCRIPTION OF EMBODIMENTS

Hereinafter, embodiments of the present invention will be described in detail with reference to the drawings.

In a transmission system using an EDFA, a configuration in which a plurality of EDFAs are cascade-connected may be used as a method for realizing low noise and high output optical amplification. The EDFA tends to increase the noise figure when operated to have a high gain. Therefore, among the plurality of cascade-connected EDFAs, the EDFA in the preceding stage is operated to have low gain and low noise, and the EDFA in the subsequent stage is operated to have high gain.

The excess noise added in the amplifier depends on the input signal power. Therefore, for example, the influence of the noise figure in the amplification in the first-stage EDFA among the plurality of cascade-connected EDFAs becomes dominant in the noise figure in the amplification in the two cascade-connected EDFAs. Accordingly, it possible to achieve both low noise and high gain.

In the optical amplification system and the optical amplification device (the optical amplification apparatus) according to each embodiment described below, the OPA is cascade-connected in accordance with the configuration of the EDFA as described above. As a result, the optical amplification system and the optical amplification device (the optical amplification apparatus) in the embodiment described below realize high gain and high output parametric amplification.

In the OPA, since a constant amplification gain is obtained regardless of the input signal power, the amplification gain of the entire optical amplification system is equal to the sum of the gains of the respective OPAs within the saturation output power. In addition, as described above, a high-efficiency OPA having a high gain tends to have a small saturation output power, and a low-efficiency OPA tends to have a large saturation output power. Therefore, it is possible to increase the output of the entire optical amplification system by arranging the high-efficiency OPA in the preceding stage and arranging the low-efficiency OPA in the subsequent stage. Unlike the EDFA, the OPA has a small change in noise figure due to gain. Therefore, it is considered that the penalty in the noise plane by adopting the configuration in which the OPA having a lower gain is arranged at the subsequent stage is not large.

First Embodiment

Hereinbelow, a first embodiment of the present invention will be described.

[Configuration of Optical Amplification System]

Figure 1:
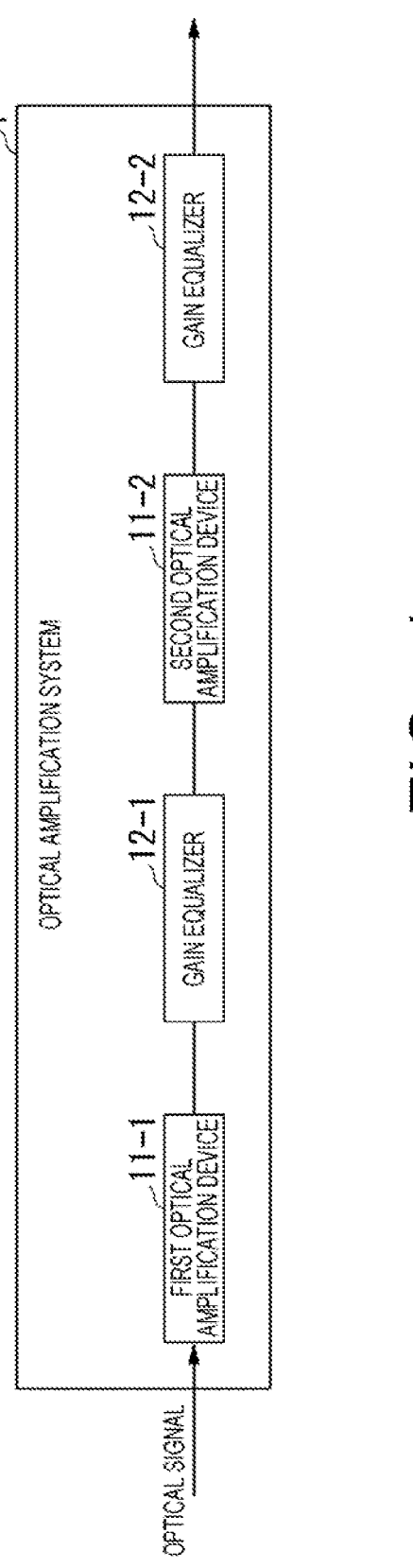
FIG. 1 is an overall configuration diagram of an optical amplification system 1 according to a first embodiment of the present invention.

Hereinafter, a configuration of the optical amplification system 1 according to the present embodiment will be described. FIG. 1 is an overall configuration diagram of an optical amplification system 1 according to a first embodiment of the present invention. As illustrated in FIG. 1, the optical amplification system 1 includes a first optical amplification device 11-1, a gain equalizer 12-1, a second optical amplification device 11-2, and a gain equalizer 12-2.

In the following description, in a case where it is not necessary to distinguish and describe the first optical amplification device 11-1 and the second optical amplification device 11-2, they are simply referred to as "optical amplification device 11". Furthermore, in the following description, in a case where it is not necessary to distinguish and describe the gain equalizer 12-1 and the gain equalizer 12-2, they are simply referred to as "gain equalizer 12".

The optical amplification device 11 is, for example, an optical amplifier provided at regular intervals in an optical fiber transmission system of an optical amplification relay transmission system. The optical amplification device 11 compensates for an optical loss caused when the optical signal propagates through the optical fiber. As illustrated in FIG. 1, the optical amplification system 1 is a system that amplifies an optical signal by two optical parametric amplifiers (hereinafter, referred to as "OPA") of the first optical amplification device 11-1 and the second optical amplification device 11-2 cascade-connected.

A transmission signal (optical signal) is incident on the first optical amplification device 11-1 which is the first-stage OPA from the optical fiber transmission line. The first optical amplification device 11-1 amplifies the incident optical signal and outputs the signal to the gain equalizer 12-1. The optical signal output from the first optical amplification device 11-1 is tilted according to the gain spectrum of the OPA.

The optical signal output from the first optical amplification device 11-1 is input to the gain equalizer 12-1. The gain equalizer 12-1 is configured to include, for example, a filter for equalizing gains. The gain equalizer 12-1 flattens (gain-equalizes) the input (tilted) optical signal. The gain equalizer 12-1 outputs the flattened optical signal to the second optical amplification device 11-2.

The optical signal output from the gain equalizer 12-1 is input to the second optical amplification device 11-2 which is an OPA in the subsequent stage. The second optical amplification device 11-2 amplifies the incident optical signal and outputs the signal to the gain equalizer 12-2. The optical signal output from the second optical amplification device 11-2 is tilted according to the gain spectrum of the OPA.

The optical signal output from the first optical amplification device 11-1 is input to the gain equalizer 12-2. The gain equalizer 12-2 is configured to include, for example, a filter for equalizing gains. The gain equalizer 12-2 flattens (gain-equalizes) the input (tilted) optical signal. The gain equalizer 12-2 outputs the flattened optical signal to the optical fiber transmission line.

In a case where the spectrum after amplification is tilted, a high gain frequency and a low gain frequency are generated. In order to perform high-quality amplification relay, it is necessary to finally amplify an optical signal so that a low gain frequency becomes desired power, and attenuate a high gain frequency component by a gain equalizer to flatten a spectrum.

When the optical signal tilted by the first-stage OPA is input to the subsequent-stage OPA, the power of the high-gain frequency component consumes the output of the OPA more than necessary. Accordingly, it difficult to increase the gain and the output of the entire optical amplification system. Therefore, it is desirable to flatten the spectrum using a gain equalizer for each amplification.

On the other hand, the frequency dependence of the gain in the OPA is smaller than the frequency dependence of the gain in the EDFA or the like. Therefore, depending on the characteristics of the OPA, the operation range of the gain equalizer, the desired gain, and the like, it is also conceivable to perform the gain equalization only once on only the optical signal output from the last OPA among the plurality of cascade-connected OPAs.

Note that the optical amplification system 1 illustrated in FIG. 1 includes two optical amplification devices 11 (OPA), but the number of optical amplification devices 11 is not limited thereto. The number of optical amplification devices 11 may be three or more.

Note that a band-pass filter may be applied to the optical signal after optical amplification output from the first optical amplification device 11-1 and the second optical amplification device 11-2. The band-pass filter cuts off noise components generated outside the signal band and extracts only signal components.

[Configuration of Optical Amplification Device]

Figure 2:
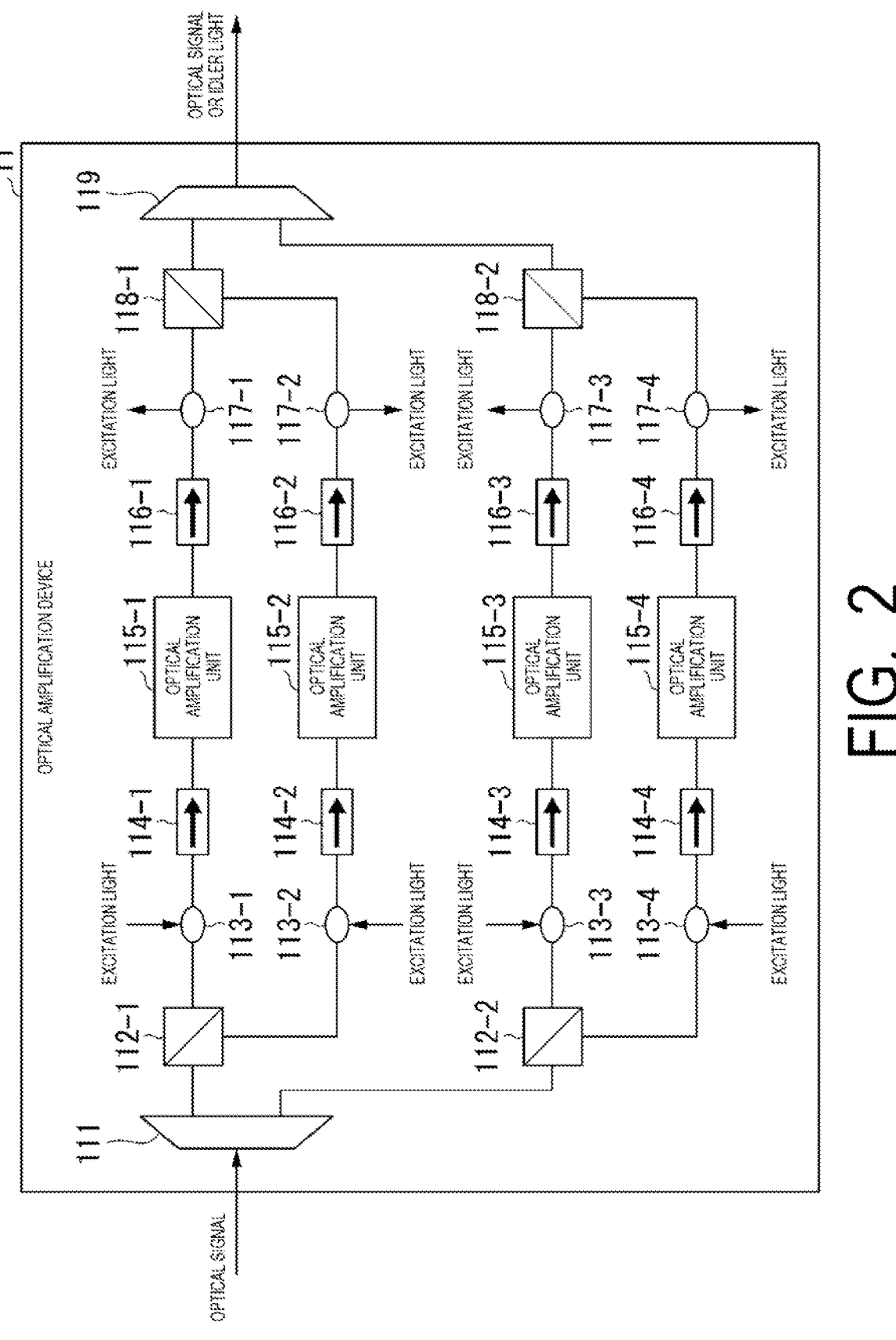
FIG. 2 is a diagram illustrating a configuration of an optical amplification device 11 according to the first embodiment of the present invention.

Hereinafter, a configuration of the optical amplification device 11 according to the present embodiment will be described. FIG. 2 is a diagram illustrating a configuration of an optical amplification device 11 according to the first embodiment of the present invention.

As illustrated in FIG. 2, the optical amplification device 11 includes a band demultiplexing unit 111, a polarization separation unit 112-1, a polarization separation unit 112-2, an excitation light multiplexing unit 113-1 to an excitation light multiplexing unit 113-4, an optical amplification unit 115-1 to an optical amplification unit 115-4, an excitation light separation unit 117-1 to an excitation light separation unit 117-4, a polarization combining unit 118-1, a polarization combining unit 118-2, and a band multiplexing unit 119.

An optical signal is input from the optical fiber transmission line or the gain equalizer 12 to the optical amplification device 11. The optical amplification device 11 amplifies the input optical signal and outputs the signal to the gain equalizer 12. As described above, the optical amplification device 11 is, for example, an optical amplifier provided at regular intervals in an optical fiber transmission system of an optical amplification relay transmission system. The optical amplification device 11 compensates for an optical loss caused when the optical signal propagates through the optical fiber.

The band demultiplexing unit 111 demultiplexes the optical signal input to the optical amplification device 11. The band demultiplexing unit 111 demultiplexes the optical signal into a component A and a component B which are two band components with a center frequency (hereinafter, the frequency is referred to as a "fundamental frequency") of a phase matching condition of the amplification medium as a boundary. The band demultiplexing unit 111 outputs the optical signal of the component A to the polarization separation unit 112-1 and outputs the optical signal of the component B to the polarization separation unit 112-2.

Note that the reason why the band demultiplexing unit 111 divides the optical signal into two bands as described above is that idler light, which is phase conjugate light of the input optical signal, is generated at a frequency symmetric with respect to the fundamental frequency along with optical parametric amplification to be described later. In the OPA, idler light that is phase conjugate light of an optical signal is generated as a secondary effect generated at the time of amplification of an input optical signal. For signal transmission, any one light component of an original optical signal and idler light may be transmitted. Conventionally, a light component that is not used for signal transmission is cut by a wavelength filter, so that an optical fiber for signal transmission is not excited. The optical signal and the idler light are complete copies of each other except that they are in a phase conjugate relationship with each other.

The polarization separation unit 112-1 separates the optical signal of the component A output from the band demultiplexing unit 111 using, for example, a polarization beam splitter or the like. This is because the nonlinear phenomenon in the nonlinear medium has polarization dependence. The polarization separation unit 112-1 separates the optical signal of the component A into a component Ax and a component Ay which are two orthogonal polarization state components. The polarization separation unit 112-1 outputs the optical signal of the component Ax to the excitation light multiplexing unit 113-1, and outputs the optical signal of the component Ay to the excitation light multiplexing unit 113-2.

The polarization separation unit 112-2 separates the optical signal of the component B output from the band demultiplexing unit 111 using a polarization beam splitter or the like. As described above, this is because the nonlinear phenomenon in the nonlinear medium has polarization dependence. The polarization separation unit 112-2 separates the optical signal of the component B into a component Bx and a component By which are two orthogonal polarization state components. The polarization separation unit 112-2 outputs the optical signal of the component Bx to the excitation light multiplexing unit 113-3, and outputs the optical signal of the component By to the excitation light multiplexing unit 113-4.

The excitation light multiplexing unit 113-1 to the excitation light multiplexing unit 113-4 include, for example, a wavelength multiplexing filter or a dichroic mirror.

The optical signal of the component Ax output from the polarization separation unit 112-1 and the excitation light are input to the excitation light multiplexing unit 113-1. The excitation light multiplexing unit 113-1 multiplexes the optical signal of the component Ax and the excitation light. The excitation light multiplexing unit 113-1 outputs the optical signal multiplexed with the excitation light to the optical amplification unit 115-1.

The optical signal of the component Ay output from the polarization separation unit 112-2 and the excitation light are input to the excitation light multiplexing unit 113-2. The excitation light multiplexing unit 113-2 multiplexes the optical signal of the component Ay and the excitation light. The excitation light multiplexing unit 113-2 outputs the optical signal multiplexed with the excitation light to the optical amplification unit 115-2.

The optical signal of the component Bx output from the polarization separation unit 112-3 and the excitation light are input to the excitation light multiplexing unit 113-3. The excitation light multiplexing unit 113-3 multiplexes the optical signal of the component Bx and the excitation light. The excitation light multiplexing unit 113-3 outputs the optical signal multiplexed with the excitation light to the optical amplification unit 115-3.

The optical signal of the component By output from the polarization separation unit 112-4 and the excitation light are input to the excitation light multiplexing unit 113-4. The excitation light multiplexing unit 113-4 multiplexes the optical signal of the component By and the excitation light. The excitation light multiplexing unit 113-4 outputs the optical signal multiplexed with the excitation light to the optical amplification unit 115-4.

The optical amplification unit 115-1 to the optical amplification unit 115-4 include an optical parametric amplifier having a secondary or tertiary high non-linear medium.

The optical signal output from the excitation light multiplexing unit 113-1 is input to the optical amplification unit 115-1. The optical amplification unit 115-1 performs optical parametric amplification on the input optical signal. With the optical parametric amplification, idler light (phase conjugate light) that is a phase conjugate component of the optical signal of the component Ax is generated. The idler light is generated at a frequency symmetrical to the frequency of the optical signal of the component Ax with the fundamental frequency of the amplification medium as a boundary. The optical amplification unit 115-1 outputs the optically parametrically amplified optical signal to the excitation light separation unit 117-1.

The optical signal output from the excitation light multiplexing unit 113-2 is input to the optical amplification unit 115-2. The optical amplification unit 115-2 performs optical parametric amplification on the input optical signal. With the optical parametric amplification, idler light (phase conjugate light) that is a phase conjugate component of the optical signal of the component Ay is generated. The idler light is generated at a frequency symmetrical to the frequency of the optical signal of the component Ay with the fundamental frequency of the amplification medium as a boundary. The optical amplification unit 115-2 outputs the optically parametrically amplified optical signal to the excitation light separation unit 117-2.

The optical signal output from the excitation light multiplexing unit 113-3 is input to the optical amplification unit 115-3. The optical amplification unit 115-3 performs optical parametric amplification on the input optical signal. With the optical parametric amplification, idler light (phase conjugate light) that is a phase conjugate component of the optical signal of the component Bx is generated. The idler light is generated at a frequency symmetrical to the frequency of the optical signal of the component Bx with the fundamental frequency of the amplification medium as a boundary. The optical amplification unit 115-3 outputs the optically parametrically amplified optical signal to the excitation light separation unit 117-3.

The optical signal output from the excitation light multiplexing unit 113-4 is input to the optical amplification unit 115-4. The optical amplification unit 115-4 performs optical parametric amplification on the input optical signal. With the optical parametric amplification, idler light (phase conjugate light) that is a phase conjugate component of the optical signal of the component By is generated. The idler light is generated at a frequency symmetrical to the frequency of the optical signal of the component By with the fundamental frequency of the amplification medium as a boundary. The optical amplification unit 115-4 outputs the optically parametrically amplified optical signal to the excitation light separation unit 117-4.

The excitation light separation unit 117-1 to the excitation light separation unit 117-4 include, for example, a wavelength multiplexing filter or a dichroic mirror.

The optical signal output from the optical amplification unit 115-1 is input to the excitation light separation unit 117-1. The excitation light separation unit 117-1 separates the input optical signal into the optical signal of the component Ax and the excitation light. The excitation light separation unit 117-1 outputs the separated optical signal of the component Ax to the polarization combining unit 118-1.

The optical signal output from the optical amplification unit 115-2 is input to the excitation light separation unit 117-2. The excitation light separation unit 117-2 separates the input optical signal into the optical signal of the component Ay and the excitation light. The excitation light separation unit 117-2 outputs the separated optical signal of the component Ay to the polarization combining unit 118-1.

The optical signal output from the optical amplification unit 115-3 is input to the excitation light separation unit 117-3. The excitation light separation unit 117-3 separates the input optical signal into the optical signal of the component Bx and the excitation light. The excitation light separation unit 117-3 outputs the separated optical signal of the component Bx to the polarization combining unit 118-2.

The optical signal output from the optical amplification unit 115-4 is input to the excitation light separation unit 117-4. The excitation light separation unit 117-4 separates the input optical signal into the optical signal of the component By and the excitation light. The excitation light separation unit 117-4 outputs the separated optical signal of the component By to the polarization combining unit 118-2.

The polarization combining unit 118-1 multiplexes the optical signal of the component Ax output from the excitation light separation unit 117-1 and the optical signal of the component Ay output from the excitation light separation unit 117-2 using, for example, a polarization beam splitter. The polarization combining unit 118-1 outputs the multiplexed optical signal of the component A to the band multiplexing unit 119.

The polarization combining unit 118-2 multiplexes the optical signal of the component Bx output from the excitation light separation unit 117-3 and the optical signal of the component By output from the excitation light separation unit 117-4 using, for example, a polarization beam splitter. The polarization combining unit 118-2 outputs the multiplexed optical signal of the component B to the band multiplexing unit 119.

The band multiplexing unit 119 multiplexes the optical signal of the component A output from the polarization combining unit 118-1 and the optical signal of the component B output from the polarization combining unit 118-2. The band multiplexing unit 119 outputs the multiplexed optical signal to the gain equalizer 12.

Note that a light component that is not used for signal transmission out of the optical signal and the idler light is cut by a filter (not illustrated) included in the band multiplexing unit 119. Note that, normally, the band multiplexing unit 119 extracts and multiplexes the optical signal, but by extracting and multiplexing the idler light, the optical amplification device 11 can be used as an optical phase conjugate converter and a wavelength converter.

Furthermore, in order to suppress reflected light from the nonlinear medium, isolators may be installed at a preceding stage and a subsequent stage of the nonlinear medium, respectively. That is, as illustrated in FIG. 2, an isolator 114-1 may be provided at the preceding stage of the optical amplification unit 115-1, and the isolator 116-1 may be provided at the subsequent stage of the optical amplification unit 115-1. In addition, as illustrated in FIG. 2, the isolator 114-2 may be provided at the preceding stage of the optical amplification unit 115-2, and the isolator 116-2 may be provided at the subsequent stage of the optical amplification unit 115-2. In addition, as illustrated in FIG. 2, the isolator 114-3 may be provided at the preceding stage of the optical amplification unit 115-3, and the isolator 116-3 may be provided at the subsequent stage of the optical amplification unit 115-3. In addition, as illustrated in FIG. 2, the isolator 114-4 may be provided at the preceding stage of the optical amplification unit 115-4, and the isolator 116-4 may be provided at the subsequent stage of the optical amplification unit 115-4.

Note that the isolators may be installed immediately before and immediately after the optical amplification unit (non-linear medium) as illustrated in FIG. 2, or other components such as a band demultiplexing unit and a polarization demultiplexing unit in addition to the optical amplification unit may be installed so as to be sandwiched between the two isolators. Furthermore, for the purpose of preventing back propagation of reflected light to the transmission side, only one isolator may be arranged in a preceding stage of the optical amplification unit (non-linear medium).

[Operation of Optical Amplification System]

Figure 3:
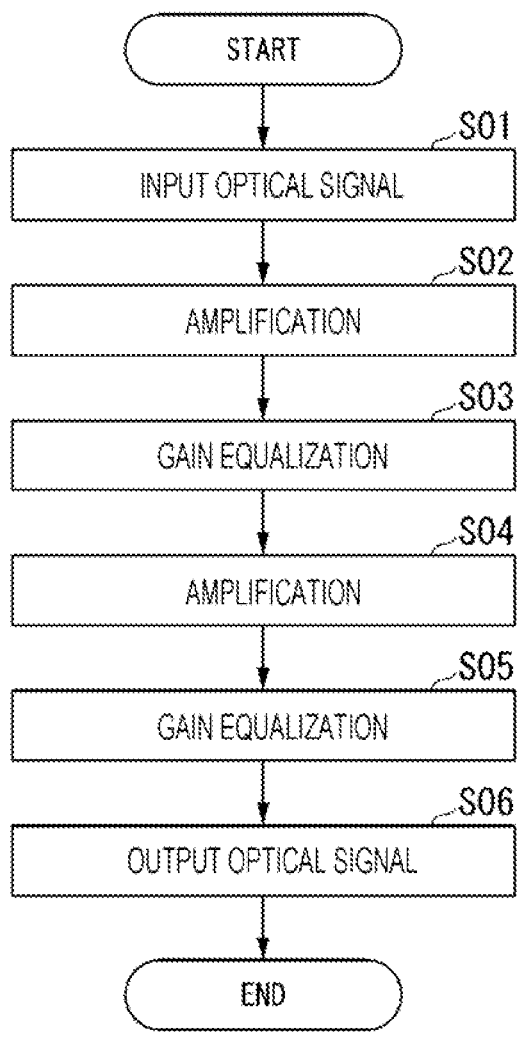
FIG. 3 is a flowchart illustrating an operation of the optical amplification system 1 according to the first embodiment of the present invention.

Hereinafter, an example of the operation of the optical amplification system 1 in the present embodiment will be described. FIG. 3 is a flowchart illustrating an operation of the optical amplification system 1 according to the first embodiment of the present invention.

A transmission signal is input to the first optical amplification device 11-1 which is the first-stage OPA from the optical fiber transmission line (step S00). The first optical amplification device 11-1 amplifies the input optical signal and outputs the signal to the gain equalizer 12-1 (step S02). Note that details of the operation of the optical amplification device 11 will be described later.

The optical signal output from the first optical amplification device 11-1 is input to the gain equalizer 12-1. The gain equalizer 12-1 flattens (gain-equalizes) the input (tilted) optical signal (step S03). The gain equalizer 12-1 outputs the flattened optical signal to the second optical amplification device 11-2.

The optical signal output from the gain equalizer 12-1 is input to the second optical amplification device 11-2 which is an OPA in the subsequent stage. The second optical amplification device 11-2 amplifies the incident optical signal and outputs the signal to the gain equalizer 12-2 (step S04).

The optical signal output from the first optical amplification device 11-1 is input to the gain equalizer 12-2. The gain equalizer 12-2 flattens (gain-equalizes) the input (tilted) optical signal (step SOS). The gain equalizer 12-2 outputs the flattened optical signal to the optical fiber transmission line (step S06). Thus, the operation of the optical amplification system 1 illustrated by the flowchart of FIG. 3 ends.

[Operation of Optical Amplification Device]

Hereinafter, an example of the operation of the optical amplification device 11 in the present embodiment will be described. FIG. 4 is a flowchart illustrating an operation of the optical amplification device 11 according to the first embodiment of the present invention. The operation of the optical amplification device 11 illustrated in FIG. 4 corresponds to the operations of steps S02 and S04 of the flowchart illustrating the operation of the optical amplification system 1 illustrated in FIG. 3 described above.

An optical signal is input from the optical fiber transmission line or the gain equalizer 12 to the optical amplification device 11 (step S201). The band demultiplexing unit 111 demultiplexes the optical signal into a component A and a component B which are two band components with the fundamental frequency as a boundary (step S202). The band demultiplexing unit 111 outputs the optical signal of the component A to the polarization separation unit 112-1 and outputs the optical signal of the component B to the polarization separation unit 112-2.

The polarization separation unit 112-1 separates the optical signal of the component A into a component Ax and a component Ay which are two orthogonal polarization state components. The polarization separation unit 112-1 outputs the optical signal of the component Ax to the excitation light multiplexing unit 113-1, and outputs the optical signal of the component Ay to the excitation light multiplexing unit 113-2. The polarization separation unit 112-2 separates the optical signal of the component B into a component Bx and a component By which are two orthogonal polarization state components. The polarization separation unit 112-2 outputs the optical signal of the component Bx to the excitation light multiplexing unit 113-3, and outputs the optical signal of the component By to the excitation light multiplexing unit 113-4 (step S203).

The optical signal of the component Ax output from the polarization separation unit 112-1 and the excitation light are input to the excitation light multiplexing unit 113-1. The excitation light multiplexing unit 113-1 multiplexes the optical signal of the component Ax and the excitation light. The excitation light multiplexing unit 113-1 outputs the optical signal multiplexed with the excitation light to the optical amplification unit 115-1. The optical signal of the component Ay output from the polarization separation unit 112-2 and the excitation light are input to the excitation light multiplexing unit 113-2. The excitation light multiplexing unit 113-2 multiplexes the optical signal of the component Ay and the excitation light. The excitation light multiplexing unit 113-2 outputs the optical signal multiplexed with the excitation light to the optical amplification unit 115-2. The optical signal of the component Bx output from the polarization separation unit 112-3 and the excitation light are input to the excitation light multiplexing unit 113-3. The excitation light multiplexing unit 113-3 multiplexes the optical signal of the component Bx and the excitation light. The excitation light multiplexing unit 113-3 outputs the optical signal multiplexed with the excitation light to the optical amplification unit 115-3. The optical signal of the component By output from the polarization separation unit 112-4 and the excitation light are input to the excitation light multiplexing unit 113-4. The excitation light multiplexing unit 113-4 multiplexes the optical signal of the component By and the excitation light. The excitation light multiplexing unit 113-4 outputs the optical signal multiplexed with the excitation light to the optical amplification unit 115-4 (step S204).

The optical signal output from the excitation light multiplexing unit 113-1 is input to the optical amplification unit 115-1. The optical amplification unit 115-1 performs optical parametric amplification on the input optical signal. The optical amplification unit 115-1 outputs the optically parametrically amplified optical signal to the excitation light separation unit 117-1. The optical signal output from the excitation light multiplexing unit 113-2 is input to the optical amplification unit 115-2. The optical amplification unit 115-2 performs optical parametric amplification on the input optical signal. The optical amplification unit 115-2 outputs the optically parametrically amplified optical signal to the excitation light separation unit 117-2. The optical signal output from the excitation light multiplexing unit 113-3 is input to the optical amplification unit 115-3. The optical amplification unit 115-3 performs optical parametric amplification on the input optical signal. The optical amplification unit 115-3 outputs the optically parametrically amplified optical signal to the excitation light separation unit 117-3. The optical signal output from the excitation light multiplexing unit 113-4 is input to the optical amplification unit 115-4. The optical amplification unit 115-4 performs optical parametric amplification on the input optical signal. The optical amplification unit 115-4 outputs the optically parametrically amplified optical signal to the excitation light separation unit 117-4 (step S205).

The optical signal output from the optical amplification unit 115-1 is input to the excitation light separation unit 117-1. The excitation light separation unit 117-1 separates the input optical signal into the optical signal of the component Ax and the excitation light. The excitation light separation unit 117-1 outputs the separated optical signal of the component Ax to the polarization combining unit 118-1. The optical signal output from the optical amplification unit 115-2 is input to the excitation light separation unit 117-2. The excitation light separation unit 117-2 separates the input optical signal into the optical signal of the component Ay and the excitation light. The excitation light separation unit 117-2 outputs the separated optical signal of the component Ay to the polarization combining unit 118-1. The optical signal output from the optical amplification unit 115-3 is input to the excitation light separation unit 117-3. The excitation light separation unit 117-3 separates the input optical signal into the optical signal of the component Bx and the excitation light. The excitation light separation unit 117-3 outputs the separated optical signal of the component Bx to the polarization combining unit 118-2. The optical signal output from the optical amplification unit 1154 is input to the excitation light separation unit 117-4. The excitation light separation unit 117-4 separates the input optical signal into the optical signal of the component By and the excitation light. The excitation light separation unit 117-4 outputs the separated optical signal of the component By to the polarization combining unit 118-2 (step S206).

The polarization combining unit 118-1 multiplexes the optical signal of the component Ax output from the excitation light separation unit 117-1 and the optical signal of the component Ay output from the excitation light separation unit 117-2. The polarization combining unit 118-1 outputs the multiplexed optical signal of the component A to the band multiplexing unit 119. The polarization combining unit 118-2 multiplexes the optical signal of the component Bx output from the excitation light separation unit 117-3 and the optical signal of the component By output from the excitation light separation unit 117-4. The polarization combining unit 118-2 outputs the multiplexed optical signal of the component B to the band multiplexing unit 119 (step S207).

The band multiplexing unit 119 multiplexes the optical signal of the component A output from the polarization combining unit 118-1 and the optical signal of the component B output from the polarization combining unit 118-2 (Step S08). The band multiplexing unit 119 removes a light component not used for signal transmission out of the optical signal and the idler light by the filer (step S209). The band multiplexing unit 119 outputs the multiplexed optical signal to the gain equalizer 12 (step S210). Thus, the operation of the optical amplification device 11 illustrated in the flowchart of FIG. 4 ends.

As described above, in the optical amplification system 1 according to the first embodiment, a plurality of OPAs are cascade-connected. As a result, the optical amplification system 1 can realize a high gain in optical parametric amplification.

Modification Example of First Embodiment

The optical amplification system 1 according to the first embodiment described above has a configuration in which a plurality of OPAs (optical amplification devices 11) having a configuration for polarization diversity from polarization separation to polarization combining are connected in a dependent manner. On the other hand, an optical amplification device 11a according to a modification example of the first embodiment described below has a configuration in which a plurality of amplification media (optical amplification units 115) are connected to the path after polarization separation in a dependent manner.

[Configuration of Optical Amplification Device]

Figure 5:
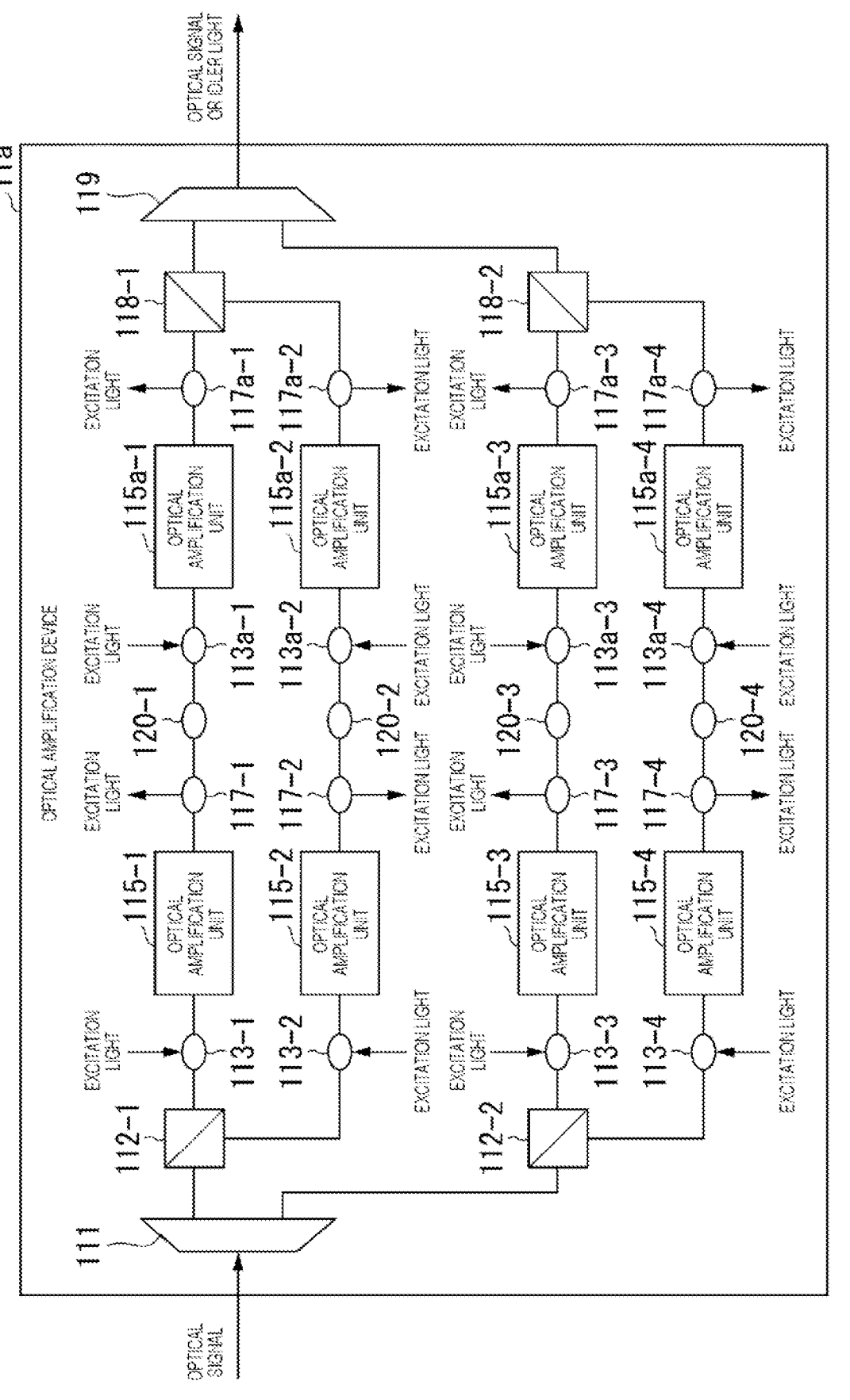
FIG. 5 is a diagram illustrating a configuration of an optical amplification device 11a according to a modification example of the first embodiment of the present invention.

Hereinafter, a configuration of the optical amplification device 11a according to the present modification example will be described. FIG. 5 is a diagram illustrating a configuration of an optical amplification device 111a according to a modification example of the first embodiment of the present invention. Note that, among the components of the optical amplification device 11a illustrated in FIG. 5, components having the same configuration as the components of the optical amplification device 11 in the first embodiment illustrated in FIG. 2 described above are denoted by the same reference numerals as those in the first embodiment, and description thereof is omitted.

As illustrated in FIG. 5, the optical amplification device 11a includes the band demultiplexing unit 11, the polarization separation unit 112-1, the polarization separation unit 112-2, the excitation light multiplexing unit 113-1 to the excitation light multiplexing unit 113-4, the optical amplification unit 115-1 to the optical amplification unit 115-4, the excitation light separation unit 117-1 to the excitation light separation unit 117-4, an unnecessary band separation unit 120-1 to an unnecessary band separation unit 120-4, an excitation light multiplexing unit 113a-1 to an excitation light multiplexing unit 113a-4, an optical amplification unit 115a-1 to an optical amplification unit 115a-4, an excitation light separation unit 117a-1 to an excitation light separation unit 117a-4, the polarization combining unit 118-1, the polarization combining unit 118-2, and the band multiplexing unit 119.

The unnecessary band separation unit 120-1 to the unnecessary band separation unit 120-4 are configured to separate the optical signal and the idler light and include a filter that removes one of the light components.

The optical signal output from the excitation light separation unit 117-1 is input to the unnecessary band separation unit 120-1. The unnecessary band separation unit 120-1 separates the optical signal and the idler light, and removes one of the light components. The unnecessary band separation unit 120-1 outputs the optical signal from which one light component has been removed to the excitation light multiplexing unit 113a-1.

The optical signal output from the excitation light separation unit 117-2 is input to the unnecessary band separation unit 120-2. The unnecessary band separation unit 120-2 separates the optical signal and the idler light, and removes one of the light components. The unnecessary band separation unit 120-2 outputs the optical signal from which one light component has been removed to the excitation light multiplexing unit 113a-2.

The optical signal output from the excitation light separation unit 117-3 is input to the unnecessary band separation unit 120-3. The unnecessary band separation unit 120-3 separates the optical signal and the idler light, and removes one of the light components. The unnecessary band separation unit 120-3 outputs the optical signal from which one light component has been removed to the excitation light multiplexing unit 113a-3.

The optical signal output from the excitation light separation unit 117-4 is input to the unnecessary band separation unit 120-4. The unnecessary band separation unit 120-4 separates the optical signal and the idler light, and removes one of the light components. The unnecessary band separation unit 120-3 outputs the optical signal from which one light component has been removed to the excitation light multiplexing unit 113a-4.

The excitation light multiplexing unit 113a-1 to the excitation light multiplexing unit 113a-4 include, for example, a wavelength multiplexing filter or a dichroic mirror.

The optical signal of the component Ax output from the unnecessary band separation unit 120-1 and the excitation light are input to the excitation light multiplexing unit 113a-1. The excitation light multiplexing unit 113a-1 multiplexes the optical signal of the component Ax and the excitation light. The excitation light multiplexing unit 113a-1 outputs the optical signal multiplexed with the excitation light to the optical amplification unit 115a-1.

The optical signal of the component Ay output from the unnecessary band separation unit 120-2 and the excitation light are input to the excitation light multiplexing unit 113a-2. The excitation light multiplexing unit 113a-2 multiplexes the optical signal of the component Ay and the excitation light. The excitation light multiplexing unit 113a-2 outputs the optical signal multiplexed with the excitation light to the optical amplification unit 115a-2.

The optical signal of the component Bx output from the unnecessary band separation unit 120-3 and the excitation light are input to the excitation light multiplexing unit 113a-3. The excitation light multiplexing unit 113a-3 multiplexes the optical signal of the component Bx and the excitation light. The excitation light multiplexing unit 113a-3 outputs the optical signal multiplexed with the excitation light to the optical amplification unit 115a-3.

The optical signal of the component By output from the unnecessary band separation unit 120-4 and the excitation light are input to the excitation light multiplexing unit 113a-4. The excitation light multiplexing unit 113a-4 multiplexes the optical signal of the component By and the excitation light. The excitation light multiplexing unit 113a-4 outputs the optical signal multiplexed with the excitation light to the optical amplification unit 115a-4.

The optical amplification unit 115a-1 to the optical amplification unit 115a-4 include an optical parametric amplifier having a secondary or tertiary high non-linear medium.

The optical signal output from the excitation light multiplexing unit 113a-1 is input to the optical amplification unit 115a-1. The optical amplification unit 115a-1 performs optical parametric amplification on the input optical signal. With the optical parametric amplification, idler light (phase conjugate light) that is a phase conjugate component of the optical signal of the component Ax is generated. The idler light is generated at a frequency symmetrical to the frequency of the optical signal of the component Ax with the fundamental frequency of the amplification medium as a boundary. The optical amplification unit 115a-1 outputs the optically parametrically amplified optical signal to the excitation light separation unit 117a-1.

The optical signal output from the excitation light multiplexing unit 113a-2 is input to the optical amplification unit 115a-2. The optical amplification unit 115a-2 performs optical parametric amplification on the input optical signal. With the optical parametric amplification, idler light (phase conjugate light) that is a phase conjugate component of the optical signal of the component Ay is generated. The idler light is generated at a frequency symmetrical to the frequency of the optical signal of the component Ay with the fundamental frequency of the amplification medium as a boundary. The optical amplification unit 115a-2 outputs the optically parametrically amplified optical signal to the excitation light separation unit 117a-2.

The optical signal output from the excitation light multiplexing unit 113a-3 is input to the optical amplification unit 115a-3. The optical amplification unit 115a-3 performs optical parametric amplification on the input optical signal. With the optical parametric amplification, idler light (phase conjugate light) that is a phase conjugate component of the optical signal of the component Bx is generated. The idler light is generated at a frequency symmetrical to the frequency of the optical signal of the component Bx with the fundamental frequency of the amplification medium as a boundary. The optical amplification unit 115a-3 outputs the optically parametrically amplified optical signal to the excitation light separation unit 117a-3.

The optical signal output from the excitation light multiplexing unit 113a-4 is input to the optical amplification unit 115a-4. The optical amplification unit 15a-4 performs optical parametric amplification on the input optical signal. With the optical parametric amplification, idler light (phase conjugate light) that is a phase conjugate component of the optical signal of the component By is generated. The idler light is generated at a frequency symmetrical to the frequency of the optical signal of the component By with the fundamental frequency of the amplification medium as a boundary. The optical amplification unit 115a-4 outputs the optically parametrically amplified optical signal to the excitation light separation unit 117a-4.

The excitation light separation unit 117a-1 to the excitation light separation unit 117a-4 include, for example, a wavelength multiplexing filter or a dichroic mirror.

The optical signal output from the optical amplification unit 115a-1 is input to the excitation light separation unit 117a-1. The excitation light separation unit 117a-1 separates the input optical signal into the optical signal of the component Ax and the excitation light. The excitation light separation unit 117a-1 outputs the separated optical signal of the component Ax to the polarization combining unit 118-1.

The optical signal output from the optical amplification unit 115a-2 is input to the excitation light separation unit 117a-2. The excitation light separation unit 117a-2 separates the input optical signal into the optical signal of the component Ay and the excitation light. The excitation light separation unit 117a-2 outputs the separated optical signal of the component Ay to the polarization combining unit 118-1.

The optical signal output from the optical amplification unit 115a-3 is input to the excitation light separation unit 117-3a. The excitation light separation unit 117a-3 separates the input optical signal into the optical signal of the component Bx and the excitation light. The excitation light separation unit 117a-3 outputs the separated optical signal of the component Bx to the polarization combining unit 118-2.

The optical signal output from the optical amplification unit 115a-4 is input to the excitation light separation unit 117a-4. The excitation light separation unit 117a-4 separates the input optical signal into the optical signal of the component By and the excitation light. The excitation light separation unit 117a-4 outputs the separated optical signal of the component By to the polarization combining unit 118-2.

As described above, in the optical amplification device 11a in the modification example of the first embodiment, the plurality of optical amplification units included in the optical amplification device 11a are cascade-connected. As a result, the optical amplification device 11a can realize a high gain in optical parametric amplification.

Note that the excitation light that has been used for amplification in the OPA in the preceding stage and has passed through the nonlinear medium may be used for amplification in the OPA in the subsequent stage. Similarly, the excitation light used for amplification in the OPA in the subsequent stage may be used for amplification in the OPA in the preceding stage.

Note that the configuration of the optical amplification system 1 in the first embodiment illustrated in FIG. 1 described above and the configuration of the optical amplification device 11a in the modification example of the first embodiment illustrated in FIG. 5 may be combined. That is, a plurality of optical amplification devices may be cascade-connected, and a plurality of optical amplification units may be cascade-connected in the optical amplification device.

Second Embodiment

Hereinbelow, a second embodiment of the present invention will be described. In the optical amplification system according to the present embodiment, a high-efficiency OPA is arranged at a preceding stage, and a low-efficiency OPA is arranged at a subsequent stage. With such a configuration, the optical amplification system according to the present embodiment can output an optical signal with high saturation output power of a low-efficiency OPA.

[Configuration of Optical Amplification System]

Figure 6:
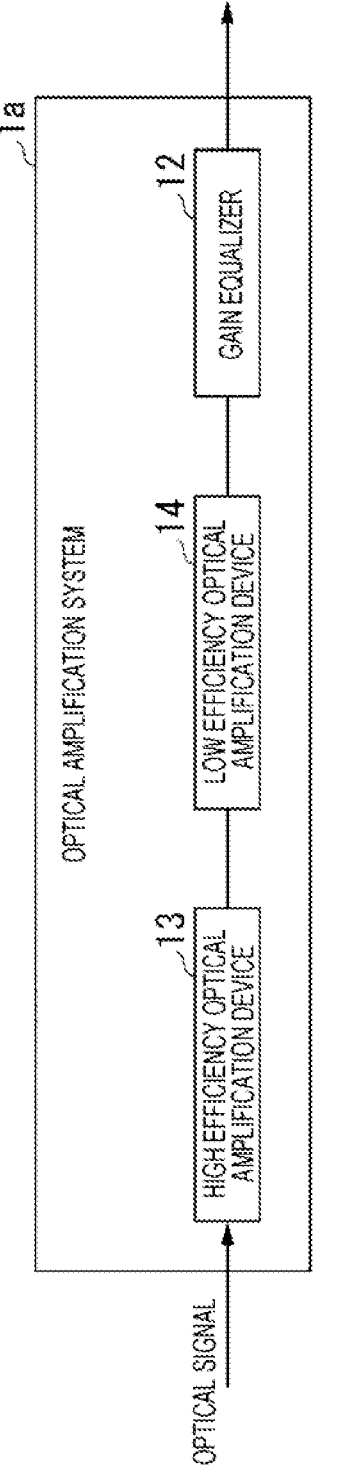
FIG. 6 is an overall configuration diagram of an optical amplification system 1a according to a second embodiment of the present invention.

Hereinafter, a configuration of the optical amplification system 1a according to the present embodiment will be described. FIG. 6 is an overall configuration diagram of an optical amplification system 1a according to the second embodiment of the present invention. Note that, among the components of the optical amplification system 1a illustrated in FIG. 6, components having the same configuration as the components of the optical amplification system 1 in the first embodiment illustrated in FIG. 1 described above are denoted by the same reference numerals as those in the first embodiment, and description thereof is omitted.

As illustrated in FIG. 6, the optical amplification system 1a includes a high-efficiency optical amplification device 13, a low-efficiency optical amplification device 14, and a gain equalizer 12.

The high-efficiency optical amplification device 13 and the low-efficiency optical amplification device 14 are, for example, an optical amplifier provided at regular intervals in an optical fiber transmission system of an optical amplification relay transmission system. The high-efficiency optical amplification device 13 and the low-efficiency optical amplification device 14 compensate for an optical loss generated when an optical signal propagates through an optical fiber. As illustrated in FIG. 6, the optical amplification system 1a is a system that amplifies an optical signal by two OPAs (optical parametric amplifiers) of the high-efficiency optical amplification device 13 and the low-efficiency optical amplification device 14 are cascade-connected.

A transmission signal (optical signal) enters the high-efficiency optical amplification device 13, which is the first-stage OPA, from an optical fiber transmission line. The high-efficiency optical amplification device 13 amplifies the incident optical signal and outputs the amplified signal to the low-efficiency optical amplification device 14. The high-efficiency optical amplification device 13 is a more efficient OPA than the low-efficiency optical amplification device 14.

The optical signal output from the high-efficiency optical amplification device 13 is input to the low-efficiency optical amplification device 14 which is the OPA in the subsequent stage. The low-efficiency optical amplification device 14 amplifies the incident optical signal and outputs the amplified signal to the gain equalizer 12. The low-efficiency optical amplification device 14 is an OPA having lower efficiency than the high-efficiency optical amplification device 13.

The gain equalizer 12 flattens (gain-equalizes) the input (tilted) optical signal.

Note that, as described above, when the optical signal tilted by the first-stage OPA is input to the subsequent-stage OPA, the power of the high-gain frequency component consumes the output of the OPA more than necessary. Accordingly, it difficult to increase the gain and the output of the entire optical amplification system. Therefore, as the optical amplification system 1 in the first embodiment described above, the optical amplification system 1a in the present embodiment may also be configured to flatten the spectrum using a gain equalizer every time amplification is performed.

Note that the optical amplification system 1a illustrated in FIG. 6 includes two optical amplifiers (OPAs), but the number of optical amplifiers is not limited thereto. The number of OPAs may be three or more. Even in this case, the more efficient the OPA is, the more the OPA is arranged in the preceding stage, and the more inefficient the OPA is, the more the OPA is arranged in the subsequent stage.

Note that a band-pass filter may be configured to be applied to an optical signal after optical amplification output from the high-efficiency optical amplification device 13 and the low-efficiency optical amplification device 14. The band-pass filter cuts off noise components generated outside the signal band and extracts only signal components.

Note that, similarly to the optical amplification system 1 in the first embodiment described above, also in the optical amplification system 1a in the present embodiment, the optical amplification device can be used as the phase conjugate converter and the wavelength converter by extracting the light component of the idler light instead of the light component of the original optical signal.

Figure 7:
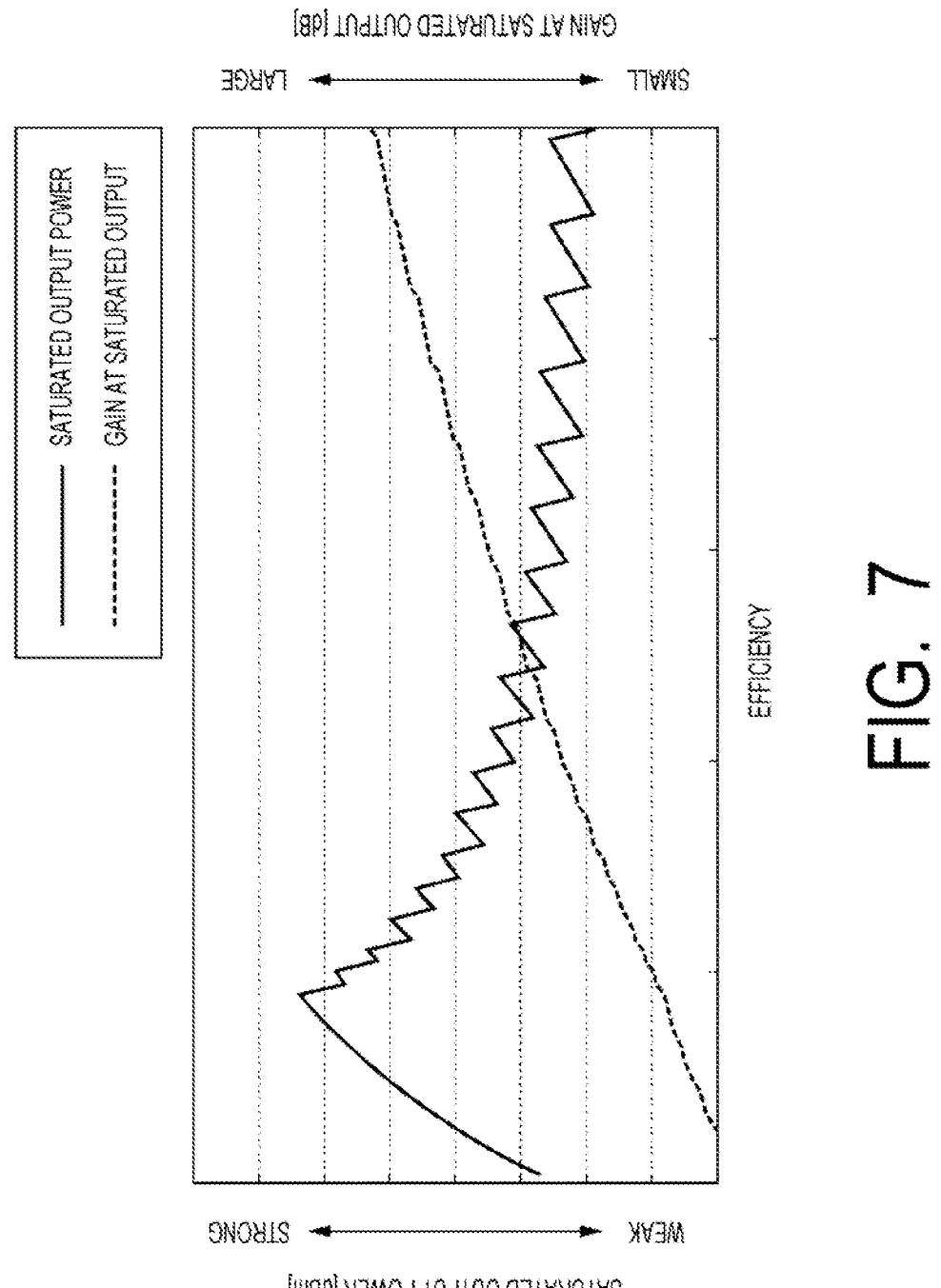
FIG. 7 is a diagram illustrating an example of a calculation result of saturated output power of a secondary nonlinear medium.

FIG. 7 is a diagram illustrating an example of a calculation result of saturated output power of a secondary nonlinear medium calculated using simultaneous differential equations of Equations (1) to (3) above. In FIG. 7, the "efficiency" on the horizontal axis represents the generation efficiency of the nonlinear process. The "saturation output power" on the vertical axis (left side) is defined as the output power when the amplification gain of the medium at the time of inputting a small signal is maximized and the input power is increased and the gain decreases by 1 [dB].

From the calculation result illustrated in FIG. 7, it can be seen that the gain at the time of saturation output is larger as the amplification medium is more efficient. In addition, it can be seen that the saturation output power monotonically increases up to a certain degree of efficiency, but then tends to decrease. On the other hand, in the vicinity where the saturation output power is the largest, the gain at the time of the saturation output is small. Therefore, it is possible to realize both the high gain and the high output by arranging the high-efficiency and high-gain OPA at the first stage and arranging the low-efficiency and low-gain OPA at the subsequent stage.

Generally, in the optical amplification system, automatic gain control (AGC) for controlling the gain of the entire optical amplification system is used when the system is started or when a desired gain changes. Therefore, it is assumed that AGC is also used in OPA. In the case of the optical amplification system 1a according to the present embodiment, it is conceivable to control the gain so as to obtain a desired gain in the entire optical amplification system by applying AGC such that the OPA in the preceding stage has a saturation output first and then applying AGC to the OPA in the subsequent stage.

As described above, according to the optical amplification system 1a of the second embodiment, the plurality of OPAs (the high-efficiency optical amplification device 13 and the low-efficiency optical amplification device 14) are cascade-connected, so that it is possible to realize high gain of optical amplification by optical parametric amplification. In addition, since the amplification medium with high efficiency is connected in cascade to the preceding stage and the amplification medium with low-efficiency is connected in cascade to the subsequent stage, the optical amplification system 1a according to the present embodiment can realize high output of optical amplification by optical parametric amplification.

According to the above-described embodiment, the optical amplification system includes a plurality of optical amplification units (optical amplifiers) cascade-connected. The optical amplification unit (The optical amplifier) includes a band division unit (a band divider), a polarization demultiplexing unit (a polarization demultiplexer), an excitation light multiplexing unit (an excitation light multiplexer), an amplification medium, an excitation light separation unit (an excitation light separator), a polarization combining unit (a polarization combiner), and a band multiplexing unit (a band multiplexer). For example, the optical amplification system is the optical amplification system 11a in the embodiment, the optical amplification unit is the first optical amplification device 11-1 and the first optical amplification device 11-2 in the embodiment, the band division unit is the band division unit 111 in the embodiment, the polarization demultiplexing unit is the polarization demultiplexing unit 112-1 and the polarization demultiplexing unit 112-2 in the embodiment, the excitation light multiplexing unit is the excitation light multiplexing unit 113-1 to the excitation light multiplexing unit 113-4 in the embodiment, the amplification medium is the optical amplification unit 115-1 to the optical amplification unit 115-4 in the embodiment, the excitation light separation unit is the excitation light separation units 117-1 to 117-4 in the embodiment, the polarization combining unit is the polarization combining unit 119 in the embodiment, and the band multiplexing unit is the band multiplexing unit 119 in the embodiment.

The band division unit divides the optical signal into optical signals of two different bands. For example, the optical signals of two different bands are optical signals of a component A and a component B which are two band components having a center frequency (fundamental frequency) of the phase matching condition of the amplification medium in the embodiment as a boundary. The polarization demultiplexing unit separates the divided optical signal into two polarization components orthogonal to each other. For example, two polarization components orthogonal to each other are a component Ax and a component Ay, which are two polarization state components orthogonal to each other, and a component Bx and a component By, which are two polarization state components orthogonal to each other, in the embodiment. The excitation light multiplexing unit multiplexes the optical signal separated by the polarization demultiplexing unit and the excitation light. The amplification medium generates an optical parametric amplification process and amplifies the optical signal. The excitation light separation unit separates the optical signal amplified by the amplification medium from the excitation light. The polarization combining unit combines the two separated polarization components. For example, the separated two polarization components are the polarization components of the component Ax and the component Ay, and the polarization components of the component Bx and the component By in the embodiment. The band multiplexing unit multiplexes the two divided bands. For example, the two divided bands are the bands of the component A and the component B in the embodiment.

Note that, in the above-described optical amplification system, the plurality of optical amplification units may be cascade-connected such that the optical amplification units having a lower saturation output power (saturation output power) and a higher gain at the time of saturation output are arranged at a preceding stage. For example, the plurality of optical amplification units are the high-efficiency optical amplification device 13 and the low-efficiency optical amplification device 14 in the embodiment.

Note that the optical amplification system may further include a gain equalization unit (a gain equalizer). For example, the gain equalization unit is the gain equalizer 12-1 and the gain equalizer 12-2 in the embodiment. The gain equalization unit flattens a gain characteristic of the optical signal amplified by the optical amplification unit.

The optical amplification system may further include a band-pass filter. The band-pass filter removes unnecessary light components generated in the optical parametric amplification process.

In addition, according to the above-described embodiment, the optical amplification device includes a plurality of optical amplification media cascade-connected. The optical amplification device includes a band division unit, a polarization demultiplexing unit, an excitation light multiplexing unit, a first amplification medium, a second amplification medium, an excitation light separation unit, a polarization combining unit, and a band multiplexing unit. For example, the optical amplification device is the optical amplification device 11a in the embodiment, the band division unit is the band division unit 111 in the embodiment, the polarization demultiplexing unit is the polarization demultiplexing unit 112-1 and the polarization demultiplexing unit 112-2 in the embodiment, the excitation light multiplexing unit is the excitation light multiplexing unit 113-1 to the excitation light multiplexing unit 113-4 and the excitation light multiplexing unit 113a-1 to the excitation light multiplexing unit 113a-4 in the embodiment, the first amplification medium is the optical amplification units 115-1 to 115-4 in the embodiment, the second amplification medium is the optical amplification units 115a-1 to 115a-4 in the embodiment, the excitation light separation unit is the excitation light separation unit 117-1 to the excitation light separation unit 117-4 and the excitation light separation unit 117a-1 to the excitation light separation unit 117a-4, the polarization combining unit is the polarization combining unit 118-1 and the polarization combining unit 118-2 in the embodiment, and the band multiplexing unit is the band multiplexing unit 119 in the embodiment.

The band division unit divides the optical signal into optical signals of two different bands. For example, the optical signals of two different bands are optical signals of a component A and a component B which are two band components having a center frequency (fundamental frequency) of the phase matching condition of the amplification medium in the embodiment as a boundary. The polarization demultiplexing unit separates the divided optical signal into two polarization components orthogonal to each other. For example, two polarization components orthogonal to each other are a component Ax and a component Ay, which are two polarization state components orthogonal to each other, and a component Bx and a component By, which are two polarization state components orthogonal to each other, in the embodiment. The excitation light multiplexing unit multiplexes the optical signal separated by the polarization demultiplexing unit and the excitation light. The first amplification medium generates an optical parametric amplification process and amplifies the optical signal. The second amplification medium generates an optical parametric amplification process and amplifies the optical signal amplified by the first amplification medium. The excitation light separation unit separates the optical signal amplified by the second amplification medium from the excitation light. The polarization combining unit combines the two separated polarization components. For example, the separated two polarization components are the polarization components of the component Ax and the component Ay, and the polarization components of the component Bx and the component By in the embodiment. The band multiplexing unit multiplexes the two divided bands. For example, the two divided bands are the bands of the component A and the component B in the embodiment.

Note that, in the above-described optical amplification device, the plurality of amplification media may be cascade-connected such that the amplification media having a lower saturation output power and a higher gain at the time of saturation output are arranged at a preceding stage.

A part or all of the optical amplification system and the optical amplification device in each of the above-described embodiments may be realized by a computer. In that case, a program for implementing these functions may be recorded in a computer-readable recording medium, and the program recorded in the recording medium may be read and executed by a computer system to implement the functions. The "computer system" mentioned herein includes an OS and hardware such as a peripheral device. The "computer-readable recording medium" refers to a portable medium such as a flexible disk, a magneto-optical disc, a ROM, or a CD-ROM, or a storage device such as a hard disk included in the computer system. The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. Also, the foregoing program may be for implementing some of the functions described above, may be implemented in a combination of the functions described above and a program already recorded in a computer system, or may be implemented with a programmable logic device such as a field programmable gate army (FPGA).

Although the embodiment of the present invention has been described in detail with reference to the drawings, specific configurations are not limited to the embodiment and include design and the like without departing from the gist of the present invention.

REFERENCE SIGNS LIST

1, 1a Optical amplification system
11, 11a Optical amplification device (Optical amplification apparatus)
11-1 First optical amplification device
11-2 Second optical amplification device

12, 12-1 to 12-2 Gain equalizer
13 High-efficiency optical amplification device
14 Low-efficiency optical amplification device
111 Band demultiplexing unit (Band demultiplexer)
112-1 to 112-4 Polarization separation unit (Polarization separator)
113-1 to 113-4, 113a-1 to 113a-4 Excitation light multiplexing unit (Excitation light multiplexer)
114-1 to 114-4, 116-1 to 116-4 Isolator
115, 115-1 to 115-4, 115a-l to 115a-4 Optical amplification unit (Optical amplifier)
117-1 to 117-4, 117a-1 to 117a-4 Excitation light separation unit (Excitation light separator)
118-1 to 118-2 Polarization combining unit (Polarization combiner)
119 Band multiplexing unit (Band multiplexer)
120-1 to 120-4 Unnecessary band separation unit (Unnecessary band separator)

The invention claimed is:

1. An optical amplification system comprising a plurality of optical amplifiers cascade-connected, wherein
   the optical amplifier includes
   a band divider that divides an optical signal into optical signals of two different bands,
   a polarization demultiplexer that separates the divided optical signal into two polarization components orthogonal to each other,
   an excitation light multiplexer that multiplexes the optical signal separated by the polarization demultiplexer unit and an excitation light,
   an amplification medium that generates an optical parametric amplification process and amplifies the optical signal,
   an excitation light separator that separates the optical signal amplified by the amplification medium and the excitation light,
   a polarization combiner that combines the two separated polarization components, and
   a band multiplexer that multiplexes the two divided bands,
   wherein the plurality of optical amplifiers are cascade-connected such that an optical amplifier having a lower saturation output power and a higher gain at the time of saturation output is arranged at a preceding stage.

2. The optical amplification system according to claim 1, further comprising
   a gain equalizer that flattens a gain characteristic of the optical signal amplified by the optical amplifier.

3. The optical amplification system according to claim 1, further comprising
   a band-pass filter that removes an unnecessary light component generated in the optical parametric amplification process.

4. An optical amplification device having a plurality of optical amplification media cascade-connected, the optical amplification device comprising:
   a band divider that divides an optical signal into optical signals of two different bands;
   a polarization demultiplexer that separates the divided optical signal into two polarization components orthogonal to each other;
   an excitation light multiplexer that multiplexes the optical signal separated by the polarization demultiplexer and an excitation light;
   a first amplification medium that generates an optical parametric amplification process and amplifies the optical signal;

a second amplification medium that generates the optical parametric amplification process and amplifies the optical signal amplified by the first amplification medium;
   an excitation light separator that separates the optical signal amplified by the second amplification medium and the excitation light;
   a polarization combiner that combines the two separated polarization components; and
   a band demultiplexer that multiplexes the two divided bands,
   wherein the plurality of amplification media are cascade-connected such that an amplification medium having a lower saturation output power and a higher gain at the time of saturation output is arranged at a preceding stage.

5. An optical amplification method by an optical amplification system including a plurality of optical amplifiers cascade-connected such that an optical amplifier having a lower saturation output power and a higher gain at the time of saturation output is arranged at a preceding stage, the optical amplification method comprising:
   a band division step of causing the optical amplifier to divide an optical signal into optical signals of two different bands;
   a polarization demultiplexing step of causing the optical amplifier to separate the divided optical signal into two polarization components orthogonal to each other;
   an excitation light multiplexing step of causing the optical amplifier to multiplex the optical signal separated in the polarization demultiplexing step and an excitation light;
   an amplification step of causing the optical amplifier to generate an optical parametric amplification process and amplify the optical signal;
   an excitation light separation step of causing the optical amplifier to separate the optical signal amplified in the amplification step and the excitation light;
   a polarization combining step of causing the optical amplifier to combine the two separated polarization components; and
   a band multiplexing step of causing the optical amplifier to multiplex the two divided bands.

6. An optical amplification method by an optical amplification device having a plurality of optical amplification media cascade-connected such that an optical medium having a lower saturation output power and a higher gain at the time of saturation output is arranged at a preceding stage, the optical amplification method comprising:
   a band division step of dividing an optical signal into optical signals of two different bands;
   a polarization demultiplexing step of separating the divided optical signal into two polarization components orthogonal to each other;
   an excitation light multiplexing step of multiplexing the optical signal separated in the polarization demultiplexing step and an excitation light;
   a first amplification step of generating, by a first amplification medium, an optical parametric amplification process and amplifying the optical signal;
   a second amplification step of generating, by a second amplification medium, an optical parametric amplification process and amplifying the optical signal amplified in the first amplification step;
   an excitation light separation step of separating the optical signal amplified in the second amplification step and the excitation light;

a polarization combining step of combining the two separated polarization components; and a band multiplexing step of multiplexing the two divided bands.

* * * * *